(12) United States Patent
Zhang et al.

(10) Patent No.: US 12,316,779 B1
(45) Date of Patent: May 27, 2025

(54) SAFETY MANAGEMENT AND CONTROL SYSTEM FOR FULL LIFECYCLE OF INDUSTRIAL CONTROL DATA

(71) Applicant: ZHEJIANG UNIVERSITY, Zhejiang (CN)

(72) Inventors: Bingsheng Zhang, Hangzhou (CN); Haitao Wang, Hangzhou (CN); Kui Ren, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/940,845

(22) Filed: Nov. 8, 2024

(30) Foreign Application Priority Data

Apr. 3, 2024 (CN) .......................... 202410400448.6

(51) Int. Cl.
   *H04L 9/32* (2006.01)
   *H04L 9/08* (2006.01)
(52) U.S. Cl.
   CPC .......... *H04L 9/3263* (2013.01); *H04L 9/0822* (2013.01)
(58) Field of Classification Search
   None
   See application file for complete search history.

(56) References Cited

U.S. PATENT DOCUMENTS

| | | | |
|---|---|---|---|
| 6,304,974 B1 | 10/2001 | Samar | |
| 2020/0195645 A1 | 6/2020 | Wei | |
| 2020/0342092 A1 | 10/2020 | Wei et al. | |
| 2023/0188364 A1* | 6/2023 | Xu | H04L 9/0863 713/156 |

FOREIGN PATENT DOCUMENTS

| | | | |
|---|---|---|---|
| CN | 1756193 A | 4/2006 |
| CN | 104991526 A | 10/2015 |
| CN | 105447390 A | 3/2016 |
| CN | 111181720 A | 5/2020 |

(Continued)

OTHER PUBLICATIONS

Chinese Office Action(202410400448.6); Date of Mailing: May 10, 2024 (9 pages).

(Continued)

*Primary Examiner* — Brandon Hoffman
(74) *Attorney, Agent, or Firm* — Wiersch Law Group

(57) ABSTRACT

A safety management and control system for full lifecycle of industrial control data, comprising: an administrator terminal holding an administrator public-private key pair and an administrator public key root certificate; a server comprising an encrypted database kernel and an initializer, the encrypted database kernel is located in a trusted execution environment and contains industrial control data; the initializer is configured to initialize the encrypted database kernel in combination with the administrator public key root certificate sent by the administrator terminal when the server is deployed for the first time, and return a self-signed certificate generated by the server to the administrator terminal; and a client that accesses the system through the certificate issued by the administrator terminal, and interacts with the server for industrial control data within the authority configured by the administrator terminal.

8 Claims, 4 Drawing Sheets

(56) References Cited

FOREIGN PATENT DOCUMENTS

| | | |
|---|---|---|
| CN | 112395631 A | 2/2021 |
| CN | 115801446 A | 3/2023 |
| CN | 116244750 A | 6/2023 |
| CN | 116980163 A | 10/2023 |
| KR | 102289456 B1 | 8/2021 |

OTHER PUBLICATIONS

Chinese Notice Of Allowance(202410400448.6); Date of Mailing: May 27, 2024 (5 pages).
The system of fast identity online CFCA FIDO+, Feb. 2019.
Dual-key Pair Model and Key Life Cycle Management in PKI, Aug. 2003.
MeetGo: A Trusted Execution Environment for Remote Applications on FPGA, Apr. 2021.

\* cited by examiner

SAFETY MANAGEMENT AND CONTROL SYSTEM FOR FULL LIFECYCLE OF INDUSTRIAL CONTROL DATA

CROSS-REFERENCE TO RELATED APPLICATIONS

The present application claims priority to Chinese Patent Application No. 202410400448.6, filed on Apr. 3, 2024, the content of which is incorporated herein by reference in its entirety.

TECHNICAL FIELD

The present disclosure belongs to the technical field of industrial control data security, and in particular, to a safety management and control system for full lifecycle of industrial control data.

BACKGROUND

With the growth of industrial data, industrial Internet will become a long-term trend. Industrial Control System (ICS) is the cornerstone of industrial digitalization, which realizes real-time data acquisition, storage, operation and real-time control output through each subsystem, thus making manufacturing more automatic, efficient, accurate, visual and controllable. Therefore, how to manage and protect the data of industrial control system in a full lifecycle is an urgent problem.

The data lifecycle of ICS can further be roughly divided into five stages: creation, storage, use, sharing and disposal, which has some unique characteristics. In the data creation stage, the data source of ICS is usually the sensor of each sub-device. Compared with the traditional data generation source, the performance of the sensor is weak, and the generated data has obvious time series characteristics. Moreover, there are usually many data sources in ICS. In the data storage stage, the amount of data in an ICS system is larger, which requires more efficient compression and storage. At the stage of data use, data analysis and decision-making systems directly oriented to ICS are lacking at present, and there is a lack of appropriate analysis and presentation mechanism. In the data sharing stage, the data formats of various industrial platforms are different and it is difficult to use them uniformly. In the data disposal stage, an efficient and available data archiving mechanism has not yet been formed in ICS.

Generally, the database will be hosted in an untrusted cloud environment, therefore the most important prerequisite for building a trusted lifecycle management system is to build a trusted database, and at the same time, it needs to be extended to cover the whole lifecycle of data collection, storage, use, sharing and disposal.

SUMMARY

In view of the problems existing in the prior art, an object of an embodiment of the present disclosure is to provide a safety management and control system for full lifecycle of industrial control data.

The embodiment of the present disclosure provides a safety management and control system for full lifecycle of industrial control data, including:

an administrator terminal that holds an administrator public-private key pair and an administrator public key root certificate;

a server including an encrypted database kernel and an initializer. The encrypted database kernel is located in a trusted execution environment and stores industrial control data; and the initializer is configured for initializing the encrypted database kernel in combination with the administrator public key root certificate sent by the administrator terminal when the server is deployed for a first time, and returning a self-signed certificate generated by the server to the administrator terminal; and a client that accesses the system through a certificate issued by the administrator terminal, and interacts with the server for the industrial control data within an authority configured by the administrator terminal.

Further, the administrator terminal generates the administrator public-private key pair in a controlled trusted execution environment, and the administrator public key root certificate is signed by an administrator himself or a certificate authority.

Further, a process of the initializer initializing the encrypted database kernel in combination with the administrator public key root certificate sent by the administrator terminal when the server is deployed for the first time includes:

receiving a remote authentication initiated by the administrator terminal, and generating an authentication digest in the trusted execution environment. The authentication digest includes an actual running environment of the server, a digest of actual execution codes, and a signature of trusted hardware using a preset key, such that the administrator terminal completes the remote authentication and establishes a communication channel with the server after receiving the authentication digest;

receiving the administrator public key root certificate and an initialized Structured Query Language (SQL) script sent by the administrator terminal through the communication channel. An administrator account number, limits of authority and authentication rules are configured in the initialized SQL script;

generating a server public-private key pair and a self-signed certificate of a server public key in the trusted execution environment, saving the initialized SQL script into a temporary file, and generating a configuration file of the encrypted database kernel. The configuration file includes a server private key, the self-signed certificate, an administrator public key root certificate, configuration parameters and a path pointing to the initialized SQL script;

staring the encrypted database kernel, such that the encrypt database kernel completes the initialization of the encrypted database kernel and a respective account creation based on the initialized SQL script and the configuration file; and sending the self-signed certificate to the administrator terminal, such that when a user intends to use the server, the administrator terminal sends the self-signed certificate to the corresponding user to complete authentication.

Further, a process of the encrypt database kernel completing the initialization of the encrypted database kernel and the respective account creation based on the initialized SQL script and the configuration file is specifically as follows:

allocating, by the encrypted database kernel, resources used by the encrypted database kernel during operation using the configuration parameters, configuring the server private key as a private key of the encrypted database kernel, configuring the administrator public key root certificate as a known certificate, and allowing the administrator terminal holding the corresponding private key to a connect; and executing, by the encrypted database kernel, the initialized SQL script, and completing the respective account creation and configuration based on the administrator account, the limits of authority and the authentication rules.

Further, a process of the client accessing the system through the certificate issued by the administrator terminal is further configured to:

create a user public-private key pair and generate a certificate signing request for a user public key by the client, send the certificate signing request to the administrator terminal, so that the administrator terminal generates a corresponding user certificate for the client using an administrator private key, create a user account for the client at the server, configure limits of authority and authentication rules of the user account, and send the user certificate, the user account and the self-signed certificate at the server to the client.

Further, the client authenticates the server using the received self-signed certificate of the server.

Further, after the client accesses the system, the data interaction between the client and the server is conducted under the Secure Sockets Layer (SSL) encrypted connection of My Structured Query Language (MySQL).

An embodiment of the present disclosure further provides a computer program product including computer programs/instructions. The computer programs/instructions, when executed by a processor, are configured to implement the system according to the first aspect.

An embodiment of the present disclosure further provides an electronic device including: one or more processors; and a memory for storing one or more programs.

When the one or more programs are executed by the one or more processors, the one or more processors are configured to implement the system according to the first aspect.

An embodiment of the present disclosure further provides a non-transitory computer-readable storage medium having computer instructions stored thereon. The instructions, when executed by a processor, are configured to implement the system according to the first aspect.

Compared with the related art, the technical solutions provided by the embodiments of the present disclosure have the following beneficial effects:

As can be seen from the above embodiments of the present disclosure, through the trusted execution environment, remote authentication and public key certificate system, a centralized industrial control data full lifecycle management system is established, which effectively solves the problem of decentralized data management in traditional industrial control systems and improves the efficiency and security of data management. The trusted execution environment is used to encrypt industrial control data, effectively preventing the leakage of plaintext data, reducing the potential risk of privileged user attacks in the cloud database, and ensuring the security of data during storage and transmission. Through the remote authentication mechanism and the public key certificate system, trust can be established at the first deployment stage of the database, solving the problem of first trust establishment in the cloud environment and enhancing the reliability of the system and user trust. The system supports flexible configuration of administrator accounts, permissions and authentication rules according to actual needs, improves the adaptability and flexibility of the system, and can meet the security management needs in different industrial control scenarios. By encrypting and authenticating all data interaction processes, the system can achieve comprehensive audit tracking, enhance the traceability and compliance of data operations, and meet the requirements of relevant laws and regulations.

It is to be appreciated that both the foregoing general description and the following detailed description are exemplary and explanatory only without limitation on the present disclosure.

BRIEF DESCRIPTION OF DRAWINGS

The drawings, which are incorporated in and constitute a part of this specification, illustrate embodiments consistent with the present disclosure and serve to explain the principles of the present disclosure together with the specification.

DESCRIPTION OF EMBODIMENTS

Figure 1:
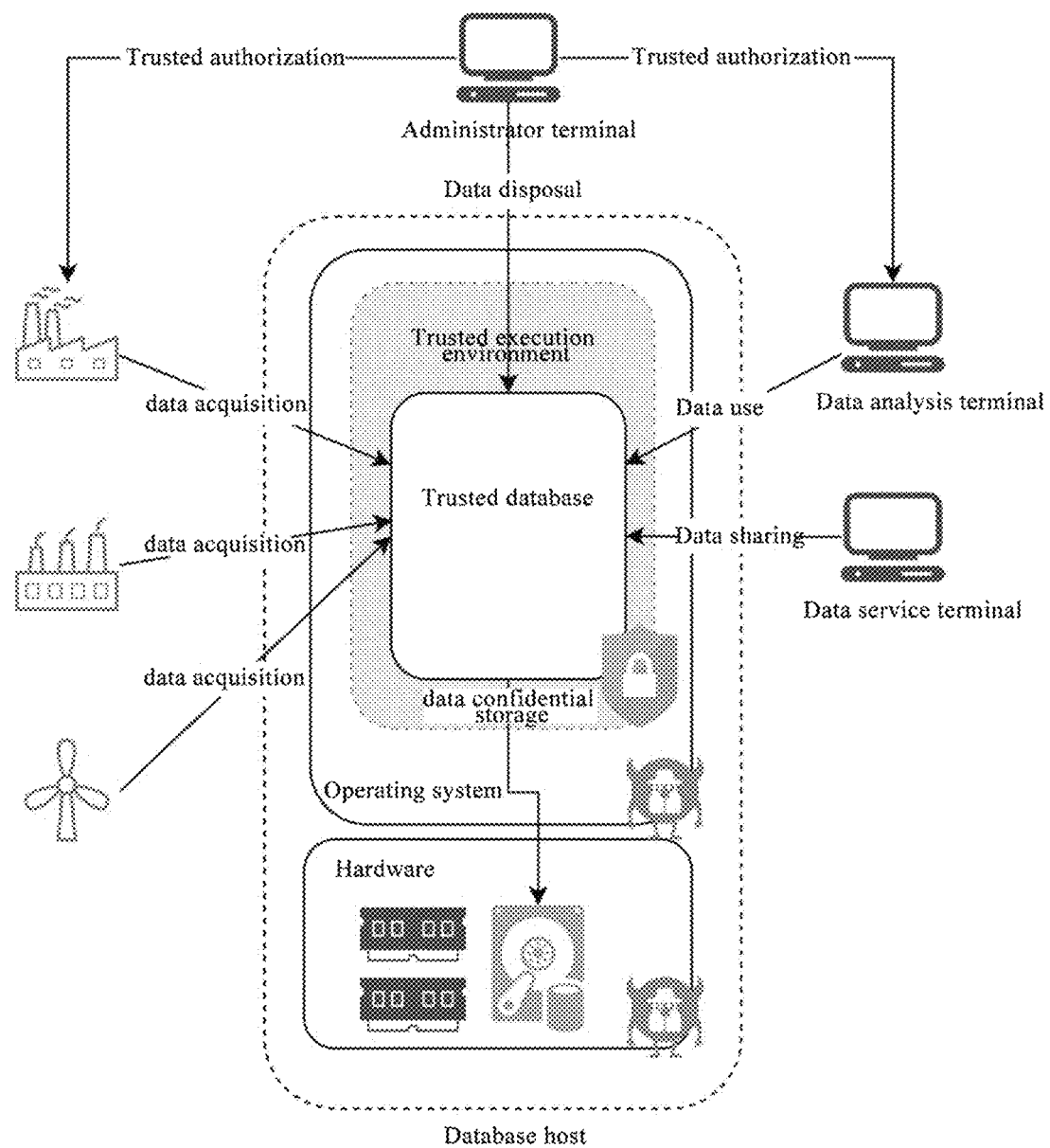
FIG. 1 is a schematic diagram of a safety management and control system for full lifecycle of industrial control data according to an exemplary embodiment.

Reference will now be made in detail to exemplary embodiments, examples of which are illustrated in the drawings. When the following description refers to the drawings, the same numbers in different drawings indicate the same or similar elements, unless otherwise indicated. The embodiments described in the following exemplary embodiments do not represent all embodiments consistent with the present disclosure.

The terminology used in the present disclosure is for the purpose of describing specific embodiments only and is not intended to limit the present disclosure. The singular forms "a", "said" and "the" used in the present disclosure and the appended claims are further intended to include the plural forms, unless the context clearly indicates other meaning. It should further be appreciated that the term "and/or" as used herein refers to and includes any or all possible combinations of one or more associated listed items.

It should be appreciated that although the terms "first", "second", "third", etc. may be used in the present disclosure to describe various types of information, the information are not be limited to these terms. These terms are only used to distinguish the same type of information from each other. For example, without departing from the scope of the present disclosure, the first piece of information can further be called the second piece of information, and similarly, the second piece of information can further be called the first piece of information. Depending on the context, the word "if" as used herein can be interpreted as "when" or "in case of" or "in response to a determination".

(I) Trusted Execution Environment (TEE)

Trusted execution environment can ensure the isolation, confidentiality and integrity of codes and data therein. Intel Software Guard Extension (SGX) is a hardware-based TEE. An isolated TEE can be created on an untrusted host through SGX, and even attackers with administrator privileges cannot invade. The interaction between external processes and TEE can only be called by specially designed ECall and OCall, which takes a long time. Considering the security design, the encrypted memory available to TEE is usually small, but TEE is able to directly access the unencrypted memory on the host. TEE further provides a Remote Authentication function. Remote Authentication allows the customers to check the running status of TEE on a remote host and establish a secure two-way communication channel between them.

(II) Data Lifecycle

Generally, the lifecycle of data is divided into five stages: creation, storage, use, sharing and disposal. Data creation occurs at the beginning of the cycle, and enterprises collect information from customers or information generated within the enterprise to form data in a specific format. In the creation stage, data usually comes from many different sources and is generated in different data formats. Data storage refers to the redundant and safe storage of current active data by enterprises to ensure that it will not change in unexpected ways. Data in the storage stage can usually only be accessed by specific personnel, and the access level is limited according to different categories of data. In the data use stage, enterprises apply data to a series of analysis activities, including data analysis, visualization, data mining and machine learning, etc. All the results of these analyses will be applied to internal decision-making or external display. Data sharing refers to providing data to people outside the enterprise. Once the data is shared, the enterprise may lose control of the data, which will lead to data security risks. Data disposal refers to archiving or deleting data that is no longer used in daily operations. It needs to ensure for archiving that data can be stored for a long time, while it needs to ensure for deleting that deleted data will not be maliciously recovered and utilized.

(III) Industrial Control System

An Industrial Control System (ICS) is a collective term used to describe different types of control systems and related instruments, including equipment, systems, networks and controls used to operate or automate industrial processes. According to different industries, each ICS has different functions, and the purpose of building an ICS is to effectively manage tasks through electronic means. Nowadays, the equipment and protocols used in the ICS are used in almost every industrial sector and key infrastructure, such as manufacturing, transportation, energy and water treatment industries. There are several common industrial control systems: Supervisory Control and Data Acquisition (SCADA) system and Distributed Control System (DCS). Local operations are usually controlled by so-called field devices, which receive monitoring commands from remote workstations.

A general ICS consists of two parts. The upper layer of the ICS is an enterprise network, which is directly interconnected with the public network and equipped with network security equipment such as firewall; the middle layer is a management network; the lowest layer is a production network, including a Remote Terminal Unit (RTU), a Programmable Logic Controller (PLC), a workstation, an industrial wireless network and other facilities. The PLC is a kind of hardware, which is used as a control component in industrial control system. The PLC can locally manage the running industrial process through feedback control equipment (such as sensors and actuators). It uses a programmable memory, in which the instructions for logic operation, sequence control, timing, counting and arithmetic operation are stored, and various devices and production processes are controlled through digital and analog inputs and outputs.

The present disclosure puts forward a safe, unified and efficient safety management and control system for full lifecycle of industrial control data with the database as the core, which can realize confidential collection, trusted storage, use, sharing and trusted disposal of data. As shown in FIG. 1, the system includes an administrator terminal, a server and a client. The administrator terminal holds an administrator public-private key pair and an administrator public key root certificate, is a trusted terminal of the enterprise, and has the ultimate control right of the trusted database and all industrial control data therein; the server includes an encrypted database kernel and an initializer. The encrypted database kernel is located in a trusted execution environment and stores industrial control data; the initializer is used for initializing the encrypted database in combination with the administrator public key root certificate sent by the administrator terminal when the encrypted database is deployed for the first time; the client accesses the system through the certificate issued by the administrator terminal, and interacts with the encrypted database for industrial control data within the limits of authority configured by the administrator terminal, including data acquisition terminals, data use terminals and the like. The data acquisition terminals can be any industrial control systems, and the data use terminals (data analysis terminals, data service terminals, etc.) are further trusted terminals of enterprises.

Generally, the database is located in an untrusted host (such as a cloud server), and the confidentiality of data in the database can be protected to a limited extent by using a trusted execution environment. However, users further need to consider the authenticity of the database and the confidentiality of the connection. Authenticity means that the encrypted database connected by the user is indeed an encrypted database instance deployed by the user himself, not an instance forged by any attacker; confidentiality means that the data interaction between users and encrypted databases is carried out under encryption. Generally, the Remote Authentication mechanism provided by the trusted execution environment has a complicated process and is difficult to be directly reused in the existing database system, which usually leads to the incompatibility of communication protocols and makes users have to use special clients.

In order to solve the above two problems and ensure the confidential collection and trusted storage of data, the present disclosure uses the SSL encryption connection and certificate authentication function of MySQL integrated in a MySQL client to perform trusted deployment and initialization of the encrypted database.

Firstly, a component, i.e. an initializer, is added to the server. The initializer is independent of the encryption database kernel and used for initialization trust when the server is deployed for the first time.

After the server is deployed to the machine for the first time, the encrypted database kernel is still in an uninitialized state, and the network port (service port) of the database itself for external services is further in an unmonitored state, therefore the user cannot initiate a connection to this port. At this point, only the initializer is running. The initializer itself is implemented in the trusted execution environment, and it will expose a network port (authentication port) for initialization authentication after startup. Users need to complete remote authentication through an authentication port and initializer. In the process of remote authentication, the trusted execution environment will generate a digital digest of program codes based on trusted hardware, which contains the code information of the initializer itself and the encrypted database kernel. The digest will be sent to users, and the user can judge, according to the digest, whether the codes running in the trusted execution environment of the server is their own expected codes. After this authentication is completed, the user initializes the encrypted database kernel through the initializer and completes the necessary configuration such as certificate and administrator user. Finally, the initializer closes the authentication port and at the same time, the service port of the encrypted database is opened, completing the whole initialization process and starting to provide services.

Figure 2:
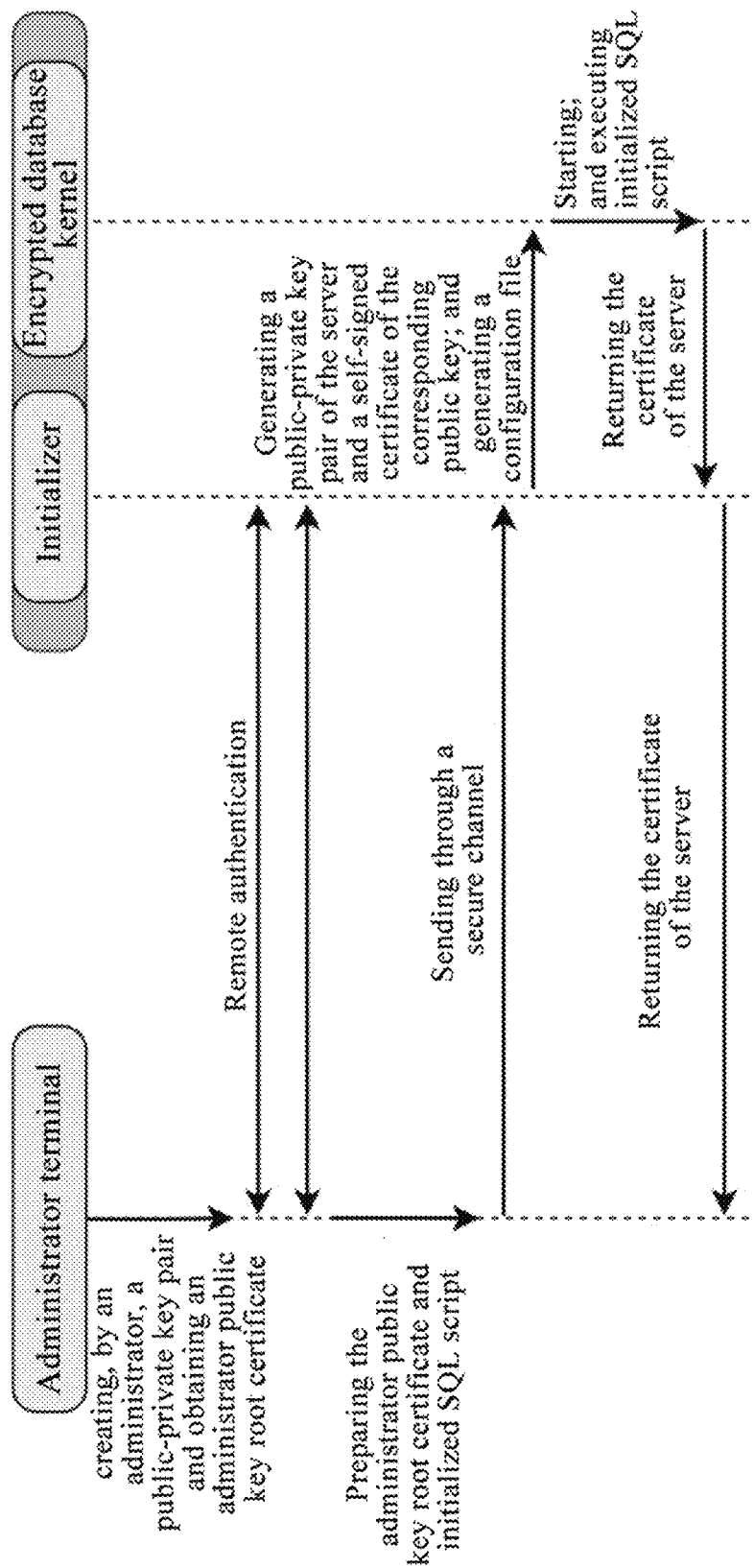
FIG. 2 is an initialization flow chart when an encrypted database is first deployed according to an exemplary embodiment.

FIG. 2 is a flowchart of the deployment process, which will be described in detail below:

(1) Preparation of private key and certificate: the administrator terminal first creates its own public-private key pair and obtains the administrator public key root certificate. The certificate may be self-signed, preferably signed by a certificate authority. The creation of the administrator public-private key pair should be carried out in the trusted execution environment controlled by itself, and the private key should be properly kept. Subsequently, the administrator private key will be used to issue certificates to new users for their accession.

(2) Remote authentication: the administrator terminal is connected to the authentication port of the server in the controlled trusted execution environment, and initiates a Remote Authentication to the server. The server's initializer will be challenged by this remote authentication and generate an authentication digest in the trusted execution environment. This authentication digest contains the actual running environment of the server, the abstract of the actual execution code and the signature of the trusted hardware with a special preset key. After receiving the authentication digest, the administrator terminal ensures the authenticity of the authentication digest through the authentication infrastructure provided by the trusted hardware provider and the signature in the authentication digest, and then ensures the authenticity and reliability of the entire server running environment and running codes through the actual running environment of the server in the digest and the digest of the actual execution codes, thus completing the remote authentication. After completing the remote authentication, the administrator terminal can establish a secure communication channel with the server Enclave, and all subsequent communications in the deployment process will be conducted through this channel.

(3) Preparation of initialization script: the administrator prepares the previously generated administrator public key root certificate and an initialized SQL script, in which the necessary administrator account, limits of authority and authentication rules need to be configured. Generally, this script needs to create at least one administrator user, and give it complete permissions to the database. For security reasons, the authentication method is configured as private key and certificate authentication, rather than password authentication. In subsequent connections, users and administrators are only allowed to interact with the server with the administrator account or the user account created by the administrator. The administrator packages the administrator public key root certificate with the initialized SQL script, and sends it to the initializer of the server through the secure communication channel established by remote authentication.

(4) Generation of configuration file: after receiving the administrator public key root certificate and initialized SQL script sent by the administrator, the initializer first generates a public-private key pair of the server and a self-signed certificate of the corresponding public key in the trusted execution environment. This process is completed in a trusted execution environment, and no authoritative signature is required. Then, the initializer generates the configuration file of the encrypted database kernel, including the private key of the server, the self-signed certificate, the administrator public key root certificate and the configuration parameters of the encrypted database (such as the maximum number of connections, the size of the buffer pool, the connection keep-alive time, etc.). In addition, the initializer will save the initialized SQL script in a temporary file and include the path to the initialization script in the configuration file. This configuration file is further stored inside the server Enclave.

(5) Initialization of the encrypted database kernel: after all the configuration preparations are completed, the initializer will trigger the initialization of the encrypted database. Based on the initialized SQL script, the initializer starts the encrypted database kernel with a normal startup process. The encrypted database kernel will use configuration parameters to allocate the resources used by the database kernel when it runs, set the private key of the server as the private key of the database kernel, and record that the administrator public key root certificate is set as a known certificate, allowing the connection of the client (that is, the administrator terminal) holding the corresponding private key. This process will complete the necessary processes such as configuring the basic data directory and creating the metadata database. Finally, the encrypted database kernel will execute the initialized SQL script, complete the administrator account creation and other tasks. After the initialization is completed, the initializer stops running, and the whole server stops monitoring the authentication port, therefore any connection request to the authentication port will be rejected. The encrypted database kernel starts monitoring the service port to start the service of the database, that is, the initializer only runs once and cannot be initialized multiple times.

(6) Certificate return: the initializer returns the self-signed certificate of the server public key to the administrator terminal through the secure communication channel. This certificate is unique to the encrypted database instance, that is, the "fingerprint" of this instance. The administrator should distribute this certificate to every user who intends to use this instance, and users need to confirm that they are connected to the real and unique encrypted database instance through this certificate.

After completing the above process, the administrator has the "fingerprint" certificate of the encrypted database instance, and the server is further configured with an administrator account that needs to be authenticated by the private key and certificate.

Figure 3:
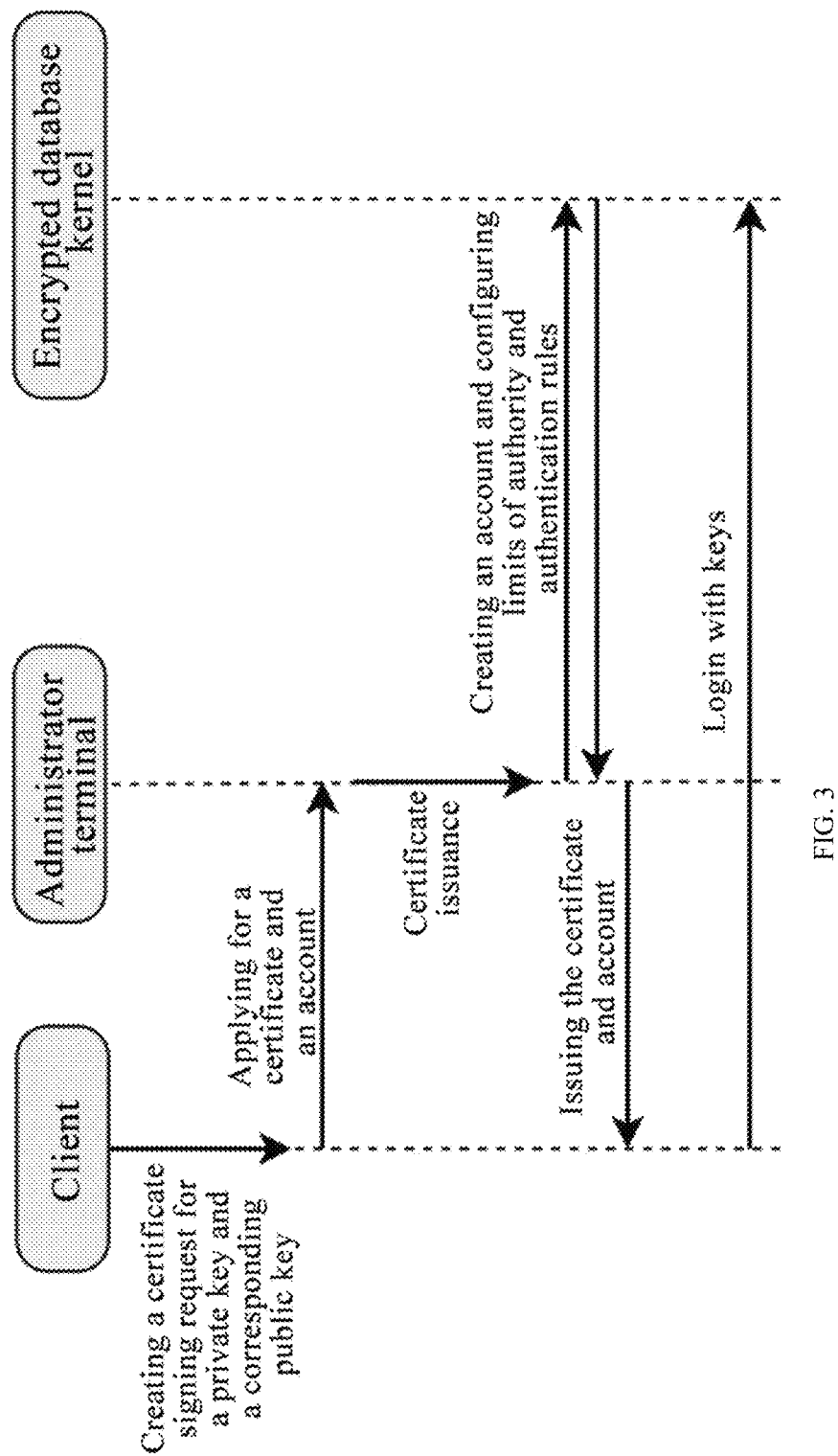
FIG. 3 is a flowchart of a client access system according to an exemplary embodiment.

The process of client access is shown in FIG. 3. Compared with the initialization process, the terminal access process is simpler. First, the client (which may be an industrial control terminal for data collection or a computing terminal for data use and sharing) that intends to use an encrypted database instance creates its own private key and generates a CSR (Certificate Signing Request) corresponding to the public key (user public key). The client sends the CSR to the administrator terminal, and the administrator terminal issues a certificate, creates an account for the user in the encrypted database instance, configures the limits of authority and authentication rules, and finally issues the account and certificate to the user, together with the "fingerprint" certificate of this instance.

Next, the user may log in to the encrypted database instance by key authentication. At the same time, the user uses the "fingerprint" certificate of the encrypted database to verify the authenticity and uniqueness of the server, that is, to ensure that the instance it is connected to is true and in line with expectations. In the end, the data interaction between the client and the server will be carried out under SSL encrypted connection, and the key negotiation and data encryption and decryption of SSL are all completed in the trusted execution environment, therefore the attacker on the database host computer cannot obtain any confidential information.

The administrator configures different permissions for different terminals to control the whole lifecycle of data. At the same time, the administrator has the final decision-making power on the data in the encrypted database, so as to complete the purpose of data disposal.

Based on the above settings, this system can realize the whole lifecycle security management and control of industrial control data. In the stage of data creation and collection, the present disclosure uses a unified data collection interface to collect data from different devices and summarize them all in the database. In the data storage stage, the system adopts an encrypted database based on trusted execution environment to ensure the confidentiality and controllability of data and avoid data being stolen or tampered with by internal and external attackers. In the stage of data use and sharing, the system has flexible user access and strong security database authentication and authentication mechanism, so that users can ensure the authenticity of the data they have obtained, and administrators have high control ability over user rights. Finally, in the data disposal stage, the database of this system allows administrators to dispose of data freely, including archiving and permanent destruction.

Figure 4:
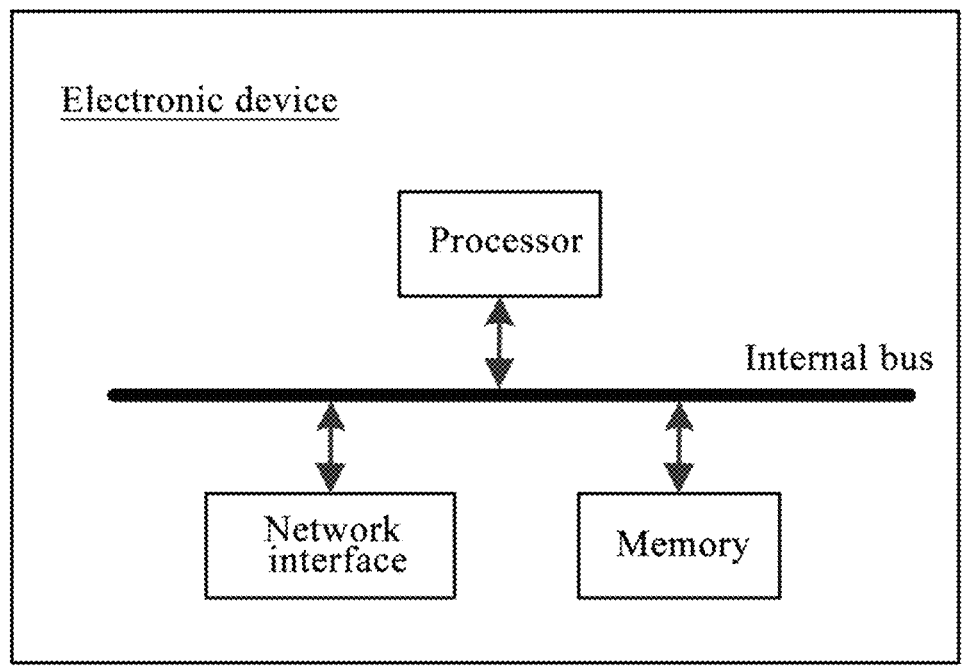
FIG. 4 is a schematic diagram of an electronic device according to an exemplary embodiment.

Correspondingly, the present disclosure further provides an electronic device, which includes one or more processors; a memory for storing one or more programs; when the one or more programs are executed by the one or more processors, the one or more processors can implement the safety management and control system for full lifecycle of industrial control data as described above. As shown in FIG. 4, it is a hardware structure diagram of any equipment with data processing capability where the safety management and control system for full lifecycle of industrial control data provided by the embodiment of the present disclosure is located. In addition to the processor, memory and network interface shown in FIG. 4, any equipment with data processing capability where the device in the embodiment is located may further include other hardware according to the actual functions of the equipment with data processing capability, which will not be described here again.

Correspondingly, the present disclosure further provides a non-transitory computer-readable storage medium, on which computer instructions are stored. When the instructions are executed by the processor, the safety management and control system for full lifecycle of industrial control data is implemented. The non-transitory computer-readable storage medium may be an internal storage unit of any equipment with data processing capability as described in any of the previous embodiments, such as a hard disk or a memory. The non-transitory computer-readable storage medium may further be an external storage device, such as a plug-in hard disk, Smart Media Card (SMC), SD card, Flash Card and the like provided on the device. Further, the non-transitory computer-readable storage medium may further include both internal storage units of any equipment with data processing capability and external storage devices. The non-transitory computer-readable storage medium is used for storing the computer program and other programs and data required by any equipment with data processing capability, and may further be used for temporarily storing data that has been output or will be output.

Those skilled in the art may readily conceive of other embodiments of the present disclosure after considering the specification and practicing the disclosure herein. The present disclosure is intended to cover any variations, uses or adaptations of the present disclosure, which follow the general principles of the present disclosure and include common sense or common technical means in this technical field that are not disclosed in the present disclosure.

It should be appreciated that the present disclosure is not limited to the precise implementation that has been described above and shown in the drawings, and various modifications and changes may be made without departing from the scope of the present disclosure.

What is claimed is:

1. A safety management and control system for full lifecycle of industrial control data lifecycle, comprising:
   an administrator terminal that holds an administrator public-private key pair and an administrator public key root certificate;
   a server comprising an encrypted database kernel and an initializer, wherein the encrypted database kernel is located in a trusted execution environment and stores the industrial control data; and the initializer is configured to initialize the encrypted database kernel in combination with the administrator public key root certificate sent by the administrator terminal when the server is deployed for a first time, and return a self-signed certificate generated by the server to the administrator terminal; and
   a client configured to access the system through a certificate issued by the administrator terminal, and interact with the server for the industrial control data within an authority configured by the administrator terminal;
   wherein said the initializer is configured to initialize the encrypted database kernel in combination with the administrator public key root certificate sent by the administrator terminal when the server is deployed for the first time comprises:
   receiving a remote authentication initiated by the administrator terminal, and generating an authentication digest in the trusted execution environment, wherein the authentication digest comprises an actual running environment of the server, a digest of actual execution codes, and a signature of trusted hardware using a preset key, such that the administrator terminal completes the remote authentication and establishes a communication channel with the server after receiving the authentication digest;
   receiving the administrator public key root certificate and an initialized Structured Query Language (SQL) script sent by the administrator terminal through the communication channel, wherein an administrator account number, limits of authority and authentication rules are configured in the initialized SQL script;

generating a server public-private key pair and a self-signed certificate of a server public key in the trusted execution environment, saving the initialized SQL script into a temporary file, and generating a configuration file of the encrypted database kernel, wherein the configuration file comprises a server private key, the self-signed certificate, the administrator public key root certificate, configuration parameters and a path pointing to the initialized SQL script;

starting the encrypted database kernel, such that the encrypt database kernel completes an initialization of the encrypted database kernel and a respective account creation based on the initialized SQL script and the configuration file; and sending the self-signed certificate to the administrator terminal, such that when a user intends to use the server, the administrator terminal sends the self-signed certificate to the user to complete authentication.

2. The system according to claim 1, wherein the administrator terminal generates the administrator public-private key pair in a controlled trusted execution environment, and the administrator public key root certificate is signed by an administrator himself or a certificate authority.

3. The system according to claim 1, wherein said encrypt database kernel completes the initialization of the encrypted database kernel and the respective account creation based on the initialized SQL script and the configuration file comprises:

allocating, by the encrypted database kernel, resources used by the encrypted database kernel during operation using the configuration parameters, configuring the server private key as a private key of the encrypted database kernel, configuring the administrator public key root certificate as a known certificate, and allowing the administrator terminal holding the corresponding private key to a connect; and executing, by the encrypted database kernel, the initialized SQL script, and completing the respective account creation and configuration based on the administrator account, the limits of authority and the authentication rules.

4. The system according to claim 1, wherein the client configured to access the system through the certificate issued by the administrator terminal is further configured to:

create a user public-private key pair and generate a certificate signing request for a user public key by the client, send the certificate signing request to the administrator terminal, so that the administrator terminal generates a user certificate corresponding to the client using an administrator private key, create a user account for the client at the server, configure limits of authority and authentication rules of the user account, and send the user certificate, the user account and the self-signed certificate at the server to the client.

5. The system according to claim 4, wherein the client authenticates the server using the received self-signed certificate of the server.

6. The system according to claim 1, wherein after the client accesses the system, a data interaction between the client and the server is conducted under a Secure Sockets Layer (SSL) encrypted connection of My Structured Query Language (MySQL).

7. An electronic device comprising:

one or more processors; and a memory for storing one or more programs;

wherein when the one or more programs are executed by the one or more processors, the one or more processors are configured to implement the system according to claim 1.

8. A non-transitory computer-readable storage medium on which computer instructions are stored, wherein the computer instructions, when executed by a processor, are configured to implement the system according to claim 1.

* * * * *